United States Patent Office 3,640,991
Patented Feb. 8, 1972

3,640,991
MIXED ANHYDRIDE METHOD OF PREPARING PEPTIDES
Francis Marc Callahan, Stony Point, N.Y., assignor to American Cyanamid Company, Stamford, Conn.
No Drawing. Continuation-in-part of application Ser. No. 622,049, Mar. 10, 1967. This application Oct. 29, 1968, Ser. No. 771,604
Int. Cl. C07c 101/00, 103/52
U.S. Cl. 260—112.5    4 Claims

ABSTRACT OF THE DISCLOSURE

An improved process is described for preparing peptides by the mixed anhydride method. The improvement consists in using certain special amines which have at least one methyl group attached to nitrogen, and an electronegative group Beta to the nitrogen. The amines may be used in excess up to 150% and the peptide is synthesized with negligible racemization of the stereo isomers of the constituents which are joined to form the peptide.

RELATED APPLICATIONS

This application is a continuation-in-part of my copending application 622,049, filed Mar. 10, 1967, now abandoned.

An application of George Washington Anderson, Francis Marc Callahan, and Joan Estelle Zimmerman, Ser. No. 757,481, filed Sept. 4, 1968, and now abandoned, which is a continuation-in-part of their co-pending application Ser. No. 727,704, filed May 8, 1968, and now abandoned, describes synthetic peptides having thyrocalcitonin activities, and both of these latter applications are owned by the assignee of the present invention.

BACKGROUND OF THE INVENTION

Synthesis of peptides using the mixed anhydride procedure is well established and valuable. A review of the procedure has been presented by Albertson, Noel F., as Chapter 4, "Synthesis of Peptides with Mixed Anhydrides," pages 157–355, Organic Reactions, vol. 12, John Wiley and Sons, Inc., New York, London, 1962.

Essentially the procedure consists of the two steps of (1) forming a mixed anhydride by reacting an α-acylamino acid or a α-acylamino peptide with an alkyl chloroformate in the presence of a tertiary amine base, and then (2) reacting the resulting mixed anhydride with an amino acid derivative or peptide derivative having a free amino group to form a peptide:

1.
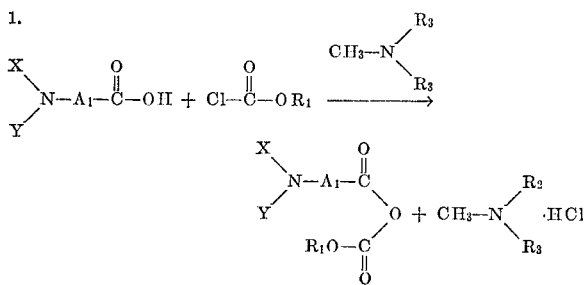

2.
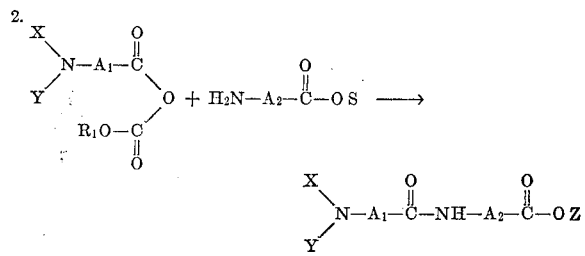

wherein X, Y, $R_1$, $R_2$ and $R_3$ are as hereinafter defined, Z is a protective group and $A_1$ and $A_2$ the residue remaining of an amino acid or peptide.

The process has proved to be difficult and critical, because unless the bases used, such as tertiary amines, are practically in equi-molecular proportions, racemization of the stereo isomers of the peptides or amino acids that are joined in forming the new peptide may occur. As for many purposes, racemized peptides are either useless, where this has caused the loss of physiological activity, or are seriously affected, which occurs when the racemization is only partial. Many peptides which are to have physiological use are in the laevo form, but certain substances, such as pantothenic acid, are difficult in that they are active only in the dextro form.

The critical necessity of using the tertiary amines in substantially equi-molecular proportions is a very serious practical drawback. It makes the process extremely critical and in some cases reduces the effectivness of the process, as in many instances an excess of the tertiary amine can be used and the reaction proceeds either more rapidly or to a greater degree of completion.

Some peptide esters, particularly esters of dipeptides, form diketopiperazines very readily. When employing such peptide esters in mixed anhydride synthesis, it is of course desirable to avoid diketopiperazine formation, and this avoidance can be achieved by adding the peptide ester in the form of its salt, rather than as a free base, to the mixed anhydride mixture containing an excess (about 100%) of one of the defined tertiary amines of the invention. In this way, as the peptide ester salt is liberated as free base by the excess amine during the addition, it reacts immediately with the mixed anhydride, thereby forming desired product and avoiding diketopiperazine formation.

SUMMARY OF THE INVENTION

The present invention is based on the surprising discovery that if certain special tertiary amines are used; namely those having at least one methyl group attached to the amino nitrogen, and an electro-negative group Beta to the amino group, they can be used in excesses, preferably not greater than 150% excess, and the process proceeds rapidly with excellent conversions and with no racemization. Examples of these special amines are those in which the electronegative group is an atom of the 6th group of the Periodic system, such as N-methylmorpholine, or a group having a member of the 5th group of the Periodic system, such as N,N'-dimethylpiperazine. Another illustration of an electro-negative group is one which involves a triple bond. This can, for example, be a triple bond joining a β-carbon atom to another carbon atom, such as N,N,N',N'-tetramethyldiaminobutyne-2. The triple bond can also be in a separate group which is Beta to the amino nitrogen, for example, β-cyanoethyldimethylamine. It is not known why these particular special types of tertiary amines can be used in excess with negligible risk of racemization, and it is not intended to limit the invention to any theory of why this surprising result occurs.

The mixed anhydride process, of which the present invention is an improvement, utilizes a chloroformate, as appears from the general description of this process in the background of invention. The chloroformate is a lower alkyl chloroformate, that is to say, not more than 6 carbon atoms in the alkyl group, and the alkyl group may be a straight chain, that is to say, forming a primary ester, or a chain branching at the α-carbon atom, forming a secondary ester. However, it should not be a tertiary alkyl group. Except for the use of the special new types of amines in excess, the general reaction procedure of the mixed anhydride method is not significantly changed, which is an advantage of the invention as new or critical techniques are not required.

As in all peptide syntheses of the mixed anhydride type, the amino group of one of the two constituents entering in the reaction to form the new peptide must be blocked. This is usually effected with an acyl group. The present invention is not limited to the use of any particular acyl group, but acyl groups of the carbobenzoxy type or phthaloyl and certain substituted acylic groups, such as triphenylmethyl and trifluoroacetyl, are preferred because they are very readily split off from the peptide form after the synthesis is complete. In the more specific descriptions these preferred types of blocking groups for the amino group of a peptide fragment or an α-amino acid will be described as typical illustrations, but the invention is not limited thereto, and other groups, such as acetyl or benzoyl and the like, are included although they are less desirable because of the difficulty of removing them after the synthesis is complete.

In the present invention the general equation of a mixed anhydride formation for use in the peptide synthesis may be written as follows:

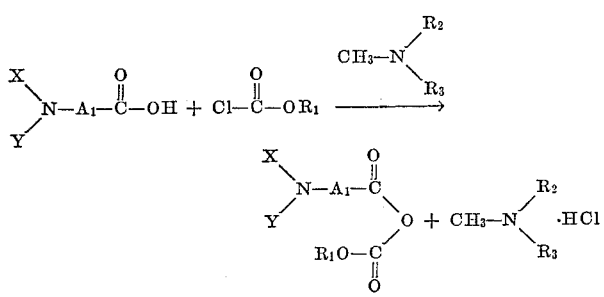

X and Y designate the protective group, X is acyl and Y may be hydrogen if a mono-basic acyl is used or X and Y can be a divalent protective group. Preferably, X is benzyloxycarbonyl, tertiarybutyloxycarbonyl, triphenylmethyl and trifluoroacetyl. $R_1$ is lower alkyl excluding tertiary esters, $R_2$ is an ethyl group having an electronegative group on the β carbon atom; $R_3$ is lower alkyl, lower alkyl phenyl, or cycloalkyl of at least 4 carbon atoms, or $R_2$ and $R_3$ may be parts of a heterocyclic ring, such as morpholine, N,N'-dimethylpiperazine.

The peptides of the present invention are made up of the naturally occurring α-amino acids described, for example, by P. Karrer, Organic Chemistry, Second English addition, Elsevier Publishing Company, Inc., New York, 1946. Among the naturally occurring amino acids may be mentioned, for example, alanine, serine, aminobutyric acid, cystine, cysteine, methionine, norvaline, valine, norleucine, leucine, isoleucine, phenylalanine, tyrosine, dihydroxyphenylalanine, tryptophane, arginine, lysine, hydroxylysine, ornithine, aspartic acid, asparagine, glutamic acid, hydroxyglutamic acid, glutamine, glycine, histidine, thiolhistidine, proline, hydroxyproline, tyrosine, diiodotyrosine, thyroxine and threonine. Since these are α- aminocarboxylic acids, they can be illustrated by the following formula:

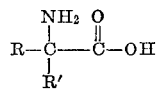

wherein R and R' are the residue remaining of the α-amino acids described above.

The reaction to prepare the mixed anhydrides of the present invention is carried out at a temperature of from about —5° C. to about —20° C. The reaction is preferably carried out under non-aqueous conditions in the presence of the preferred solvent tetrahydrofuran. Other solvents may be used, such as dimethoxyethane, dimethylacetamide, ethyl acetate, dioxolane, triethylphosphate or 5,5-dimethyldioxolane; the use of such other solvent being dependent upon the reactants. The reaction is substantially complete in from one-half minute to 15 minutes.

The rest of the reaction follows the general equation of the mixed anhydride process which has been set out above. It should be noted that the process is not in any way limited to the peptides produced because the reaction is taking place only at one end of each of the two reacting constituents; and if, as will usually be the case, one or both are themselves peptides, the remainder of the peptide molecule is immaterial to the operation of the process. It is an advantage of the present invention that it may be used to produce peptides of any size, for example those having thyrocalcitonin activity, such as thyrocalcitonin itself with 32 amino acids, or smaller fragments such as those containing amino acids 1 to 16 of the thyrocalcitonin molecule. Other peptides which can be produced by the present invention include oxytocin, insulin, vassopressin, and the like. Of course in the synthesis of very large peptides, the synthesis usually proceeds in a number of steps, smaller peptide fragments being first formed and joined together or a single amino acid added. In general, the term "peptide" is used instead of "polypeptide," although this latter is quite common in the literature. Strictly speaking, any peptide is a polypeptide because it is made up of at least two amino acids. Also, it should be understood that in the present application, we are using the more generic term of peptide for compounds which may include certain compounds that are more often referred to as proteins. In general, a protein is simply a polypeptide of large molecular weight, usually over 10,000. As far as the chemistry is concerned and as far as the reactions of the present invention are concerned, the two terms do not relate to different types of compounds.

DESCRIPTION OF THE PREFERRED EMBODIMENT

The following examples are illustrative of the use of the process of the present invention in preparing a number of typical peptides or polypeptides. For the most part, the examples deal with the formation of peptides which are not usually used as such but are used in the further synthesis of peptides having physiological activity, such as those having thyrocalcitonin activity. It should also be noted that the present invention need not be used in every step of a polypeptide synthesis. Sometimes it is used in a number of steps and certain other steps may use other well known methods of peptide synthesis. For instance, many of the examples which follow cover a chain of synthesis which forms intermediate peptides that are finally transformed into a physiologically active one. Often the last step of such a process may involve preferably a different method of coupling, and it is a great advantage of the present invention that it can be used in syntheses with other methods in certain steps, which gives a great choice and flexibility to the protein chemist.

The examples in the present specification are illustrative of a few peptides which can be prepared by the process of the present invention, which is generally applicable to the enormous number of theoretically possible compounds. It is of interest to note that in most cases a peptide described in a particular example serves as an intermediate for further synthesis. Examples 18 to 107 illustrate a sequence of peptides prepared by the present invention which finally result in the syntheses of peptides of sixteen, twenty-two, twenty-five and twenty-nine, amino acids, respectively.

These four compounds have thryocalcitonin activity and when tested by the conventional rat assay method, showed a reduction in serum calcium. These examples are taken in the main from the application of Anderson, Callahan and Zimmerman, Ser. No. 757,481, filed Sept. 4, 1968 and now abandoned. The new active peptide forms a part of the subject matter of the application referred to. It is not claimed in the present application, which is directed primarily to a process, and the examples are merely given to illustrate further peptide syntheses using the features of the present application to finally produce a useful physiologically active preparation. A number of examples in addition to the first seventeen, are set forth hereinbelow in order to show syntheses of four polypeptides which have hormone activities. Because of the very large number of examples needed to set forth the various steps in the long syntheses, and because most of the examples do not illustrate the process improvement of the present invention, those examples which do not involve the essential features of the present invention are presented in abbreviated form, setting forth reactants and products and indicating the reaction conditions by brief notations. These examples use standard conditions for peptide synthesis in accordance with the outline of general methods and conditions presented hereinbelow. Formula and other abbreviations are defined in a glossary preceding the examples. In some of the examples in addition to the first seventeen, the synthesis features of the present invention are illustrated, and these examples are presented in full detail.

It should be noted that in many of the examples set forth hereinbelow in abbreviated form, activating groups such as the N-hydroxysuccinimide are used for the carboxyl end of peptides. This is not because the features of the present invention would not be usable in some or most of these examples, but because the examples represent the actual syntheses which were carried out.

The process features of the present invention are generally usable in peptide syntheses but because of the well known fact that the possible numbers of peptides and proteins is unlimited, only a moderate number of typical illustrations are set forth in the examples it being understood that the invention is not limited to the production of the particular peptides of the examples. It is an advantage of the present invention that the process is generally applicable in peptide syntheses and its effectiveness opens up a very broad field of improved peptide syntheses.

The following glossary sets forth abbreviations used in many of the examples:

OMe—O-methyl
OEt—O-ethyl
M.A.—Mixed anhydride (usually standing for the method used in a coupling reaction)
HOAc—Acetic acid
EtOAc—Ethyl acetate
$Et_2O$—Ether. Specifically, diethyl ether
NMM—N-methylmorpholine
TLC—Thin layer chromatography
THF—Tetrahydrofuran
OBzl—O-benzyl
SBzl—S-benzyl
ONB—O-p-Nitrobenzyl
BOC—t-Butyloxycarbonyl
TFA—Trifluoroacetic acid *or* trifluoroacetate, as the case may be.

HOSu—N-hydroxysuccinimide
OSu—N-hydroxysuccinimide ester
Z—Benzyloxycarbonyl
$Z_2$—Dibenzyloxycarbonyl
$Gl_x$—Glutamic acid *or* glutamine, as the case may be.
$As_x$—Aspartic acid *or* Asparagine, as the case may be.
O-t-Bu—O-t-butyl
DMF—Dimethylformamide or N,N-dimethylformamide
DCCD—Dicyclohexylcarbodiimide
$\phi SO_3H$—Benzenesulfonic acid
$CH_3\phi SO_3H$—p-Toluenesulfonic acid
DMAC—Dimethylacetamide or N,N-dimethylacetamide i-BuOCOCl—Isobutyl chloroformate (or isobutyl chlorocarbonate)

i-BuOCOCl—See i-BuOCCl

R.T.—Room temperature

The following paragraphs 1 to 15 set forth general methods and conditions for the examples hereinafter which are usually in abbreviated form:

(1) Mixed anhydride coupling reaction. The procedure consists of (1) forming a mixed anhydride by reacting an α-acylamino acid or an α-acylamino peptide with a lower alkyl chloroformate in the presence of a tertiary amine base, and then (2) reacting the resulting mixed anhydride with an amino acid derivative having a free amino group or a peptide derivative having a free amino group, to form a peptide. The procedure is described generally in a review by Albertson, Noel F., in Chapter 4, "Synthesis of Peptides With Mixed Anhydrides," pages 157–355, Organic Reactions, Volume 12, John Wiley and Sons, Inc., New York, London, 1962. This general technique is applied in Examples 18, 27, 34, 36, 50, 56, 58, 65, 67, 69, 75, 80, 102, and 104.

(2) Alkaline hydrolysis, or saponification of an ester, a fundamental method of de-esterification described by Fieser, Louis F. and Fieser, Mary, Organic Chemistry, Third Edition, Reinhold Publishing Corporation, New York, 1956, on page 178. This general technique is applied in Examples 19, 37, 66 and 68.

(3) Acid cleavage of an amino-blocking t-butyloxycarbonyl group, a conventional technique of peptide chemistry, described by Schröder, Eberhard and Lübke, Klaus, in "(I) Amino-Protecting Groups," pages 3–51 of Volume I, Methods of Peptide Synthesis, of The Peptides, Academic Press, New York and London, 1965. This general technique is applied in Examples 20, 22, 24, 26, 30, 32, 39, 42, 47, 49, 53, 55, 57, 63, 70, 81, 86, 88, 95, 97, 101, 103 and 105.

(4) Coupling of an N-hydroxysuccinimide ester of an amino acid derivative or of a peptide derivative with an amino acid derivative or with a peptide derivative, a technique described by Anderson, G. W., et al., Journal of The American Chemical Society, volume 86, pages 1839–1842 (1964); ibidem, volume 85, page 3039; Kisfaludy, L., et al., ACTA Chemica Academiae Scientiarum Hungaricae, Tome 44, Fascicles 1–2, pages 33–35 (1965); and Löw, opere citato, pages 61–66 (1965). This general technique is applied in Examples 21, 23, 25, 31, 33, 35, 46, 54, 64, 79, 87, 89, 94, 96, 98, 106.

(5) Coupling by use of Woodwards reagent, a technique described generally by Schröder, Eberhard and Lübke, Klaus in "(III) Formation of the Peptide Bond," pages 113–114 of volume I, Methods of Peptide Synthesis, of The Peptides, Academic Press, New York and London, 1965. This technique is applied in Examples 28, 41, 43, and 48.

(6) Cleavage of a p-nitrobenzyl ester by catalytic hydrogenolysis, a conventional technique in organic and peptide chemistry, described generally by Schröder, Eberhard and Lübke, Klaus in "(II) Carboxyl-Protecting Groups," pages 61–62 of volume I, Methods of Peptide Synthesis, of The Peptides, Academic Press, New York and London, 1965. This general method is applied in Examples 29, 44, 51, 59 and 61.

(7) Cleavage of a benzyloxycarbonylamino acid or of a benzyloxycarbonylamino peptide by catalytic hydrogenolysis, a conventional technique of peptide chemistry, described by Schröder, Eberhard and Lübke, Klaus, in "(I) Amino-Protecting Groups," pages 22–30 of volume I, Methods of Peptide Synthesis, of The Peptides, Academic Press, New York and London, 1965. This general technique is applied in Example 76.

(8) Coupling by use of dicyclohexylcarbodiimide, a procedure described by Schröder, Eberhard and Lübke, Klaus in "(III) Formation of the Peptide Bond," pages 108–111, of volume I, Methods of Peptide Synthesis, of The Peptides, Academic Press, New York and London, 1965. This technique is applied in Examples 38, 52, 60, 62, 77, 82, 84 and 85.

(9) Neutralization of an acid addition salt, an elementary conversion of chemistry, neutralization being defined on page 568 in the Third Edition, Hackh's Chemical Dictionary, McGraw-Hill Book Company, New York, Toronto, London, 1944. This technique is applied in Example 40.

(10) Formation of an N-hydroxysuccinimide ester of an amino acid or of a peptide. Either the mixed anhydride method (see (1), hereinabove) or coupling by use of dicyclohexylcarbodiimide (see (8), hereinabove) may be used. This technique is applied in Examples 45 (DCCD), 90, 91, 93, 99 (M.A.).

(11) Conversion of an ester or a mixed anhydride to an amide by reaction of the ester with ammonia, on elementary organic chemistry transformation described by Fieser, Louis F., and Fieser, Mary, Organic Chemistry, Third Edition, Reinhold Publishing Corporation, New York, 1956 on pages 178–180, 445–446. This technique is applied in Examples 69, 71, and 80.

(12) Stripping of all blocking groups in a peptide (—S benzyl and —O benzyl ether groups from cysteine and serine, —N-nitro blocking groups from arginine amino acids, and t-butyloxycarbonyl N-terminal aminoblocking groups) by use of hydrofluoric acid. The technique has been described by Sakaribara, S., et al., Bulletin of the Chemical Society of Japan, vol. 40, pages 2164, etc., (1967); ibidem, volume 41, pages 438–441 (1968); ibidem, volume 41, pages 1477–1479 (1968). This technique is applied in Examples 72, 73, 74, and 107.

(13) Acid cleavage of a t-butyl ester of a C-terminal peptide, a conventional technique of peptide chemistry, described in general terms by Schröder, Eberhard and Lübke, Klaus, in "(II) Carboxyl-Protecting Groups," at pages 57–59, of volume I, Methods of Peptide Synthesis, of The Peptides, Academic Press, New York and London, 1965. This general technique, but using acetic acid saturated with hydrochloric acid as the cleaving medium, is applied in Example 78.

(14) Formation of t-butyloxycarbonylamino acid by use of t-butyl azido formate, a technique described generally by Schröder, Eberhard and Lübke, Klaus in "(I) Amino-Protecting Groups," pages 37–38 of vol. I, Methods of Peptide Synthesis, of The Peptides, Academic Press, New York and London, 1965. This technique is applied in Example 92.

(15) Reaction of an N-hydroxysuccinimide ester of a peptide with ammonia to form a peptide amide is described in Example 100.

DETAILED DESCRIPTION

The following examples illustrate in detail the preparation of peptides by the use of mixed anhydrides and the peptides resulting therefrom.

EXAMPLE 1

Preparation of benzyloxycarbonylglycyl-L-phenylalanylglycine ethyl ester

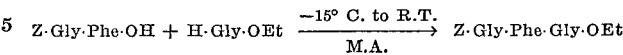

The mixed anhydride is prepared by adding 1.78 g. of carbobenzoxyglycyl-L-phenylalanine (0.0050 mole) to the reaction vessel and adding 25 ml. of tetrahydrofuran. The solution is agitated and the temperature of the contents lowered to —15° C. To this solution is added 1.01 g. of N-methylmorpholine (0.010 mole), followed by the addition of 0.67 ml. of isobutyl chloroformate (0.0050 mole). After a period of 12 minutes 0.53 g. of ethyl glycinate (0.0050 mole) is added and the material is then allowed to warm to room temperature. The product is isolated by adding the material to water and collecting the product or alternatively, by removing almost all of the tetrahydrofuran under reduced pressure and dissolving the residue in ethyl acetate (or other suitable solvent). The product is washed with appropriate reagents until a neutral wash is obtained. Evaporation of the solvent yields 2.15 g. of the tripeptide. Recrystallization from a 2% alcoholic solution gives 2.06 g. of pure L-tripeptide (93.2%) and none of the DL-isomer. A repeated experiment gives a 93.4% yield of pure L-isomer and no DL-isomer.

EXAMPLE 2

Preparation of benzyloxycarbonylglycyl-L-phenylalanylglycine ethyl ester

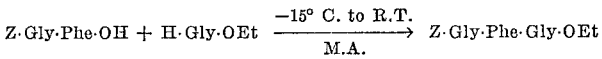

When Example 1 is repeated using N,N'-dimethylpiperazine in place of N-methylmorpholine, the yield of pure L-isomer is 94%. No DL-isomer is detected. A duplicate experiment gives a 96% yield of L-isomer and no DL-isomer.

EXAMPLE 3

Preparation of benzyloxycarbonylglycyl-L-phenylalanylglycine ethyl ester

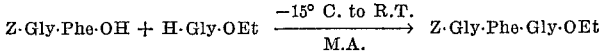

Using the procedure of Example 1 and replacing tetrahydrofuran with ethyl acetate, the yield of L-isomer is 87% and no DL-isomer is isolated.

EXAMPLE 4

Preparation of benzyloxycarbonylglycyl-L-phenylalanylglycine ethyl ester

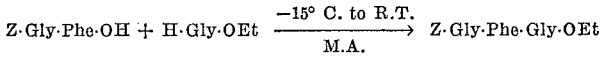

When example 1 is repeated using dioxolane in place of tetrahydrofuran, an 89% yield of L-isomer and no DL-isomer is obtained.

EXAMPLE 5

Preparation of benzyloxycarbonylglycyl-L-phenylalanylglycine ethyl ester

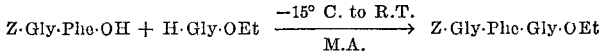

When the procedure of Example 1 is repeated using N,N,N',N'-tetramethylaminobutyne-2 in place of N-methylmorpholine, the yield of pure L-isomer is 81.6%. No DL-isomer is isolated.

EXAMPLE 6

Preparation of benzyloxycarbonylglycyl-L-phenylalanylglycine ethyl ester

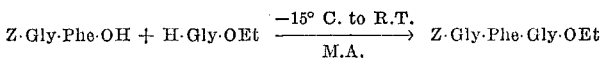

When Example 1 is repeated using β-cyanoethyldimethylamine, the yield of pure L-isomer is 90.7%. No DL-isomer is isolated.

EXAMPLE 7

This example demonstrates that when a tertiary amine other than the special defined amines of this invention is used, even in 1:1 equivalent amounts, racemization may occur.

To 1.78 grams (0.005 mole) of carbobenzoxyglycyl-L-phenylalanine in a 100 milliliter flask is added 25 milliliters of tetrahydrofuran containing 0.70 milliliter (0.005 mole of triethylamine. The solution is stirred mechanically and cooled to −15° C. Then 0.70 milliliter (0.00525 mole) of isobutyl chloroformate is added to the cooled solution. After a period of 12 minutes 0.54 gram (0.00525 mole) of ethyl glycinate is added, and the mixture is stirred until room temperature is reached. The crude product is isolated with the removal of nearly all of the tetrahydrofuran by applying reduced pressure.

The crude product above is dissolved in 75 ml. of ethyl acetate and the solution is washed successively with 25 ml. portions of a 5% sodium bicarbonate solution, water, 1 N hydrochloric acid, and water. The washed ethyl acetate solution is dried with anhydrous sodium sulfate. Evaporation of the dried solution yields the crystalline tripeptitde. Recrystallization of this material from ethanol (1 part of product to 50 parts of solvent) yields 1.86 grams (84.5%) of pure L-isomer. About 181 milligrams (8.2%) of DL-isomer was isolated. A duplicate experiment gives 79% of L-isomer and 7.2% of DL-isomer.

EXAMPLES 8–15

When two molar equivalents of the following amines are used in the procedure of Example 7, a common procedure in the prior art when the hydrochloride of the amino acid ester is used, the following results are obtained:

| Example | Amine | Yield, percent L-isomer | DL-isomer |
|---|---|---|---|
| 8 | Trimethylamine | Trace | 67.8 |
| 9 | N-methylpyrrolidine | None | 90.6 |
| 10 | Dimethylcyclohexylamine | 71.5 | 15.0 |
| 11 | Dimethylethylamine | 14.5 | 62.0 |
| 12 | Diethylmethylamine | 68.1 | 18.3 |
| 13 | Dimethylpropylamine | 33.0 | 49.0 |
| 14 | N,N,N′,N′-tetramethylethylenediamine | 2.6 | 61.1 |
| 15 | N-methylpiperidine | 62.0 | 25.0 |

EXAMPLE 16

Attempted preparation of BOC·Arg·Asn·Leu·ONB (L, L, L), t-Butyloxycarbonyl-N-nitro-L-arginyl-L-asparaginyl-L-leucine-p-nitrobenzyl ester

BOC·Arg·OH + TFA·xH·Asn·Leu·ONB

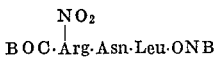

BOC·Arg·Asn·Leu·ONB

A one molar equivalent of

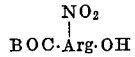

BOC·Arg·OH t-butyloxycarbonyl - N - nitro-L-arginine and one molar equivalent of N-methylmorpholine is dissolved in tetrahydrofuran with warming. The resulting solution is cooled to about 0° C., and one molar equivalent of isobutyl chloroformate is added.

A separate solution of one molar equivalent of TFA·xH·Asn·Leu·ONB, L-asparaginyl-L-leucine-p-nitrobenzyl ester trifluoroacetate and one molar equivalent of triethylamine in tetrahydrofuran is prepared at about 0° C. This latter solution is then added to the pre-formed mixed anhydride mixture.

At least four neutral compounds are finally isolated, one of which is identified as the diketopiperazine of L-asparaginyl-L-leucine-p-nitrobenzyl ester. The desired tripeptide could not be isolated.

EXAMPLE 17

Attempted preparation of BOC·Ser·Ala·Tyr·ONB (L,L,L), t-butyloxycarbonyl-L-seryl-L-alanyl-L-tyrosine p-nitrobenzyl ester

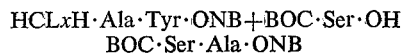

BOC·Ser·Ala·ONB

One molar equivalent of BOC·Ser·OH, t-butyloxycarbonyl-L-serine, is dissolved in tetrahydrofuran containing one molar equivalent of N-methylmorpholine, and the resulting solution is chilled to about −13° C. To this chilled solution one molar equivalent of isobutyl chloroformate is added.

When an attempt is made to prepare a solution of the free base H·Ala·Tyr·ONB by neutralizing the

with one equivalent of sodium bicarbonate, the effort is frustrated because of instant formation of crystalline diketopiperazine, melting at 283–286° C.

EXAMPLE 18

Preparation of t-butyloxycarbonyl-L-valyl-L-leucine p-nitrobenzyl ester

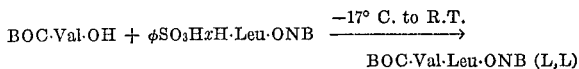

BOC·Val·Leu·ONB (L,L)

EXAMPLE 19

Preparation of t-butyloxycarbonyl-L-valyl-L-leucine

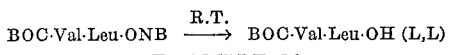

EXAMPLE 20

Preparation of L-valyl-L-leucine trifluoroacetate

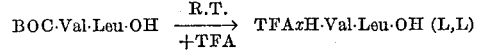

EXAMPLE 21

Preparation of t-butyloxycarbonyl-S-benzyl-L-cysteinyl-L-valyl-L-leucine

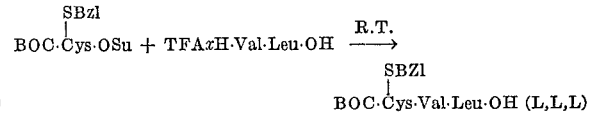

BOC·Cys·Val·Leu·OH (L,L,L)

EXAMPLE 22

Preparation of S-benzyl-L-cysteinyl-L-valyl-L-leucine trifluoroacetate

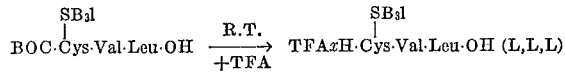

EXAMPLE 23

Preparation of t-butyloxycarbonyl-L-threonyl-S-benzyl-L-cysteinyl-L-valyl-L-leucine

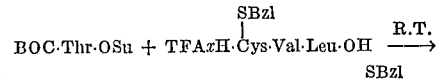

BOC·Thr·Cys·Val·Leu·OH (L,L,L,L)

EXAMPLE 24

Preparation of L-threonyl-S-benzyl-L-cysteinyl-L-valyl-L-leucine trifluoroacetate

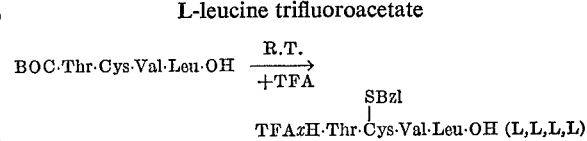

TFA·xH·Thr·Cys·Val·Leu·OH (L,L,L,L)

EXAMPLE 25

Preparation of t-butyloxycarbonyl-O-benzyl-L-seryl-L-threonyl-S-benzyl-L-cysteinyl-L-valyl-L-leucine

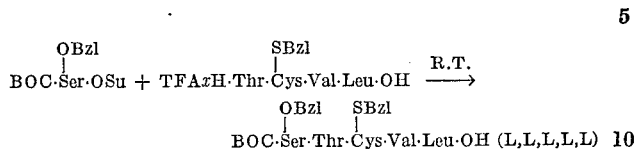

EXAMPLE 26

Preparation of O-benzyl-L-seryl-L-threonyl-S-benzyl-L-cysteinyl-L-valyl-L-leucine trifluoroacetate

EXAMPLE 27

Preparation of t-butyloxycarbonyl-S-benzyl-L-cysteinyl-O-benzyl-L-seryl - L - asparaginyl - L - leucyl-O-benzyl-L-seryl-L-threonyl-S-benzyl-L-cysteinyl-L-valyl-L-leucine

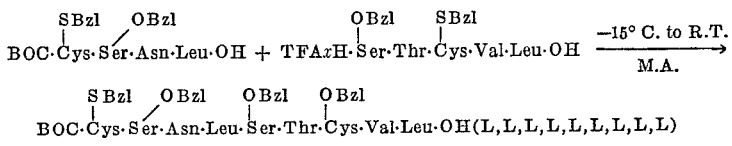

EXAMPLE 28

Preparation of t-butyloxycarbonyl-L-asparaginyl-L-leucine p-nitro ester

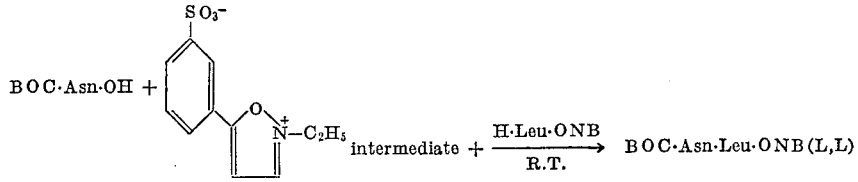

EXAMPLE 29

Preparation of t-butyloxycarbonyl-L-asparaginyl-L-leucine

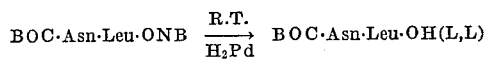

EXAMPLE 30

Preparation of L-asparaginyl-L-leucine trifluoroacetate

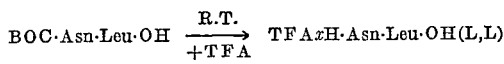

EXAMPLE 31

Preparation of t-butyloxycarbonyl-O-benzyl-L-seryl-L-asparaginyl-L-leucine

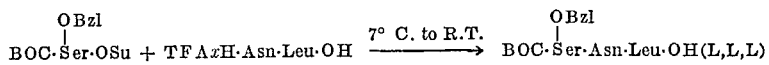

EXAMPLE 32

Preparation of O-benzyl-L-seryl-L-asparaginyl-L-leucine trifluoroacetate

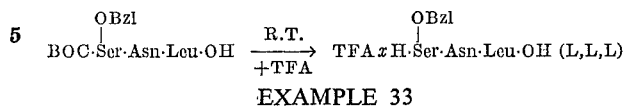

EXAMPLE 33

Preparation of t-butyloxycarbonyl-S-benzyl-L-cysteinyl-O-benzyl-L-seryl-L-asparaginyl-L-leucine

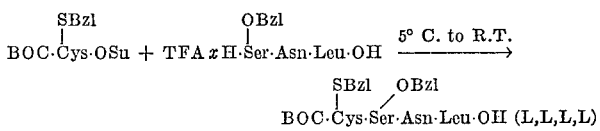

EXAMPLE 34

Preparation of t - butyloxycarbonyl - S - benzyl - L-cysteinyl - O - benzyl - L-seryl-L-asparaginyl-L-leucine N-hydroxysuccinimide ester SBzl  OBzl
 |   /
BOC·Cys·Ser·Asn·Leu·OH   —17° C. to 47° C.
                        ────────────────→
                              M.A.

SBzl  OBzl
 |   /
BOC·Cys·Ser·Asn·Leu·OSu (L,L,L,L)

EXAMPLE 35

Preparation of t-butyloxycarbonyl-S-benzyl-L-cysteinyl-O-benzyl-L-seryl-L-asparaginyl-L-leucyl-O-benzyl-L-seryl--L-threonyl-S-benzyl-L-cysteinyl-L-valyl-L-leucine SBzl  OBzl            OBzl SBzl
 |   /                 |    |
BOC·Cys·Ser·Asn·Leu·OSu + TFAxH·Ser·Thr·Cys·Val·Leu·OH   R.T. to 38° C.
                                                        ──────────────→

SBzl  OBzl        OBzl  SBzl
 |   /             |     |
BOC·Cys·Ser·Asn·Leu·Ser·Thr·Cys·Val·Leu·OH (L,L,L,L,L,L,L,L)

EXAMPLE 36

Preparation of Z₂·His·Arg·OMe (L,L), dibenzyloxycarbonyl-L-histidyl-N^G-nitro-L-arginine methyl ester

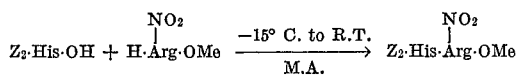

To 400 milliliters of tetrahydrofuran in a one-liter flask equipped with a mechanical stirrer was added 33 grams (0.075 mole) of dibenzyloxycarbonyl-L-histidine and 18.2 milliliters of N-methylmorpholine. The mixture was cooled to about −15° C. using a methanol-ice bath. 10.05 milliliters of isobutyl chloroformate was added with rapid stirring and the reaction forming the mixed anhydride was allowed to continue for 4 minutes. At the end of this period, a chilled suspension of 20.18 grams (0.075 mole) of the methyl nitroarginine hydrochloride and 10.5 milliliters (0.075 mole) of triethylamine in 200 milliliters of dimethylacetamide was added. The suspension was itself prepared by dissolving methyl nitroarginine hydrochloride in dimethylacetamide, warming, adding triethylamine and cooling; triethylamine hydrochloride precipitates on cooling. The reaction mixture with the chilled suspension added was stirred cold for two minutes and further stirred at room temperature for about 40 minutes. The mixture was then filtered. The filtrate was concentrated under reduced pressure to an orange colored, oily residue. The residue was dissolved in about 300 milliliters of ethyl acetate and washed successively with two 100 milliliter portions of water, two 100 milliliter portions of dilute sodium bicarbonate and finally with 250 milliliters of dilute sodium chloride. The organic phase was dried over anhydrous sodium sulfate and filtered and concentrated under reduced pressure to a pale yellow oil. The strong orange color was removed in the first water wash. The yellow oil was triturated with ether with vigorous rubbing to yield an amorphous product. Yield 41.5 grams (87%) of theoretical.

EXAMPLE 37

Preparation of benzyloxycarbonyl-L-histidyl-N$^G$-nitro-L-arginine

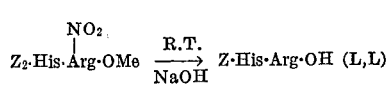

EXAMPLE 38

Preparation of benzyloxycarbonyl-L-histidyl-N$^G$-nitro-L-arginyl-L-phenylalanine p-nitrobenzyl ester

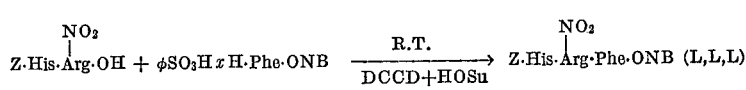

EXAMPLE 39

Preparation of L-histidyl-N$^G$-nitro-L-arginyl-L-phenylalanine p-nitrobenzyl ester dihydrobromide

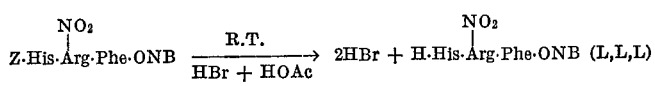

EXAMPLE 40

Preparation of L-histidyl-N$^G$-nitro-L-arginyl-L-phenylalanine p-nitrobenzyl ester

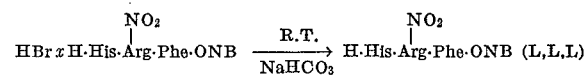

EXAMPLE 41

Preparation of t-butyloxycarbonyl-L-asparaginyl-L-phenylalanine p-nitrobenzyl ester

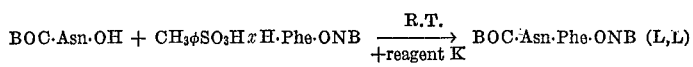

EXAMPLE 42

Preparation of L-asparaginyl-L-phenylalanine p-nitrobenzyl ester hydrochloride

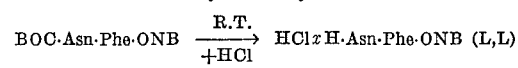

EXAMPLE 43

Preparation of t-butyloxycarbonyl-L-asparaginyl-L-asparaginyl-L-phenylalanine p-nitrobenzyl ester

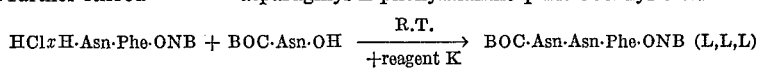

EXAMPLE 44

Preparation of t-butyloxycarbonyl-L-asparaginyl-L-asparaginyl-L-phenylalanine

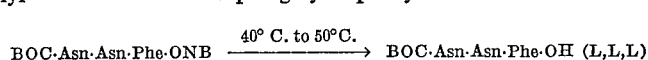

EXAMPLE 45

Preparation of t-butyloxycarbonyl-L-asparaginyl-L-asparaginyl-L-phenylalanine N-hydroxysuccinimide ester

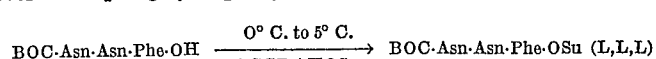

EXAMPLE 46

Preparation of t-butyloxycarbonyl-L-asparaginyl-L-asparaginyl-L-phenylalanyl-L-histidyl-NG-nitro-L-arginyl-L-phenylalanine p-nitrobenzyl ester

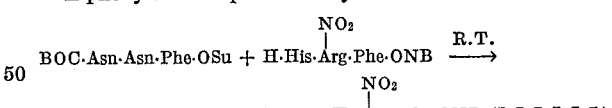

EXAMPLE 47

Preparation of L-asparaginyl-L-asparaginyl-L-phenylalanyl-L-histidyl-NG-nitro-L-arginyl-L-phenylalanine p-nitrobenzyl ester

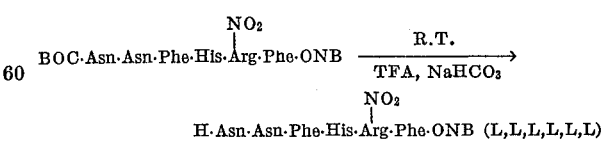

EXAMPLE 48

Preparation of t-butyloxycarbonyl-L-asparaginyl-L-leucine p-nitrobenzyl ester

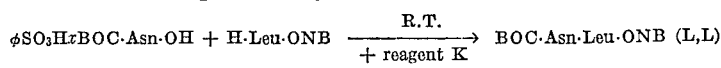

EXAMPLE 49

Preparation of L-asparaginyl-L-leucine p-nitrobenzyl ester trifluoroacetate

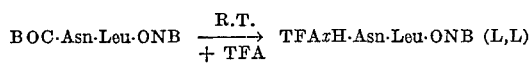

EXAMPLE 50

Preparation of BOC·Arg·Asn·Leu·OBB (L,L,L), t-butyloxycarbonyl-NG, nitro-L-arginyl-L-asparaginyl-L-leucine p-nitrobenzyl ester

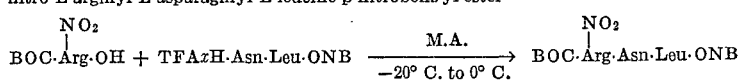

A 3.80 gram (0.0139 mole) portion of

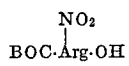

(t-butyloxycarbonyl - NG - nitro - L - arginine) and 3.06 milliliters (0.0278 mole) of N-methylmorpholine were mixed in about 150 milliliters of tetrahydrofuran and warmed on a steam bath. Dissolution was incomplete. The small amount of insolubles was separated by filtration. The filtrate was cooled to −20° C. in a Dry Ice-acetone bath. A 1.86 milliliter (0.0139 mole) portion of iso-butylchloroformate was added and the mixed anhydride formed in 4 minutes. A solution of 6.88 grams (0.0139 mole) of TFA·xH·Asn·Leu·ONB, L - asparaginyl - L - leucine p-nitrobenzyl ester trifluoroacetate, in 40 milliliters of tetrahydrofuran was added and the mixture was removed from the bath and placed in a refrigerator at 0° C. overnight. The mixture was then concentrated in vacuo and the residue was extracted into a mixture of 150–200 milliliters of ethyl acetate and 50 milliliters of water. The ethyl acetate layer was separated and washed successively with 50 milliliter portions of dilute phosphoric acid, water, 10% sodium bicarbonate solution, and finally water. The washed ethyl acetate layer was dried over sodium sulfate and concentrated in vacuo to yield a gum. This gum was triturated with diethyl ether and washed from the flask with diethyl ether to give 8.31 grams (91% yield) of an amorphous solid.

EXAMPLE 51

Preparation of t-butyloxycarbonyl-NG-nitro-L-arginyl-L-asparaginyl-L-leucine

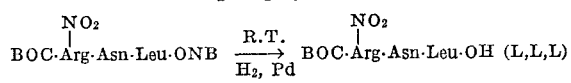

EXAMPLE 52

Preparation of t-butyloxycarbonyl - NG - nitro-L-arginyl-L-asparaginyl - L - leucyl - L - asparaginyl - L - asparaginyl-L-phenylalanyl-L-histidyl - NG - nitro-L-arginyl-L-phenylalanine p-nitrobenzyl ester

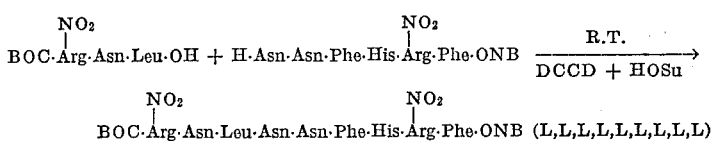

EXAMPLE 53

Preparation of NG-nitro - L - arginyl - L - asparaginyl-L-leucyl - L - asparaginyl - L - asparaginyl - L - phenylalanyl-L-histidyl - NG - nitro - L - arginyl-L-phenylalanine p-nitrobenzyl ester

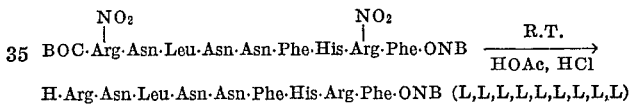

EXAMPLE 54

Preparation of t-butyloxycarbonyl - L - tryptophanyl-NG-nitro-L-asparaginyl - L - leucyl - L - asparaginyl-L-asparaginyl - L - phenylalanyl - L - histidyl - NG - nitro-L-arginyl-L-phenylalanine p-nitrobenzyl ester

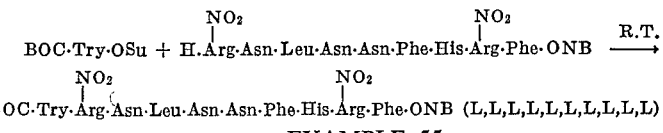

EXAMPLE 55

Preparation of L-tryptophanyl - N - nitro - L - arginyl-L-asparaginyl - L - leucyl - L - asparaginyl - L - phenylalanyl-L-histidyl - N - nitro - L - arginyl - L - phenylalanine p-nitrobenzyl ester

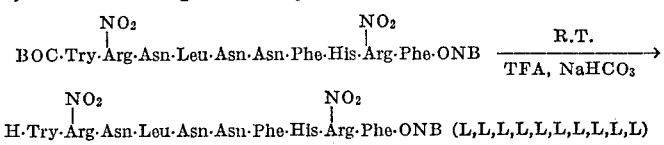

EXAMPLE 56

Preparation of t-butyloxycarbonyl - L - alanyl - L - tryosine p-nitro ester

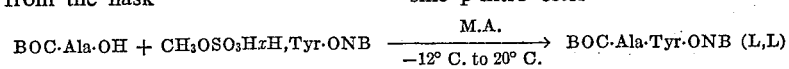

A solution was made of 9.45 grams (0.050 mole) of the BOC·Ala·OH, t-butyloxycarbonyl - L - alanine, and 11.0 milliliters (0.100 mole) of N-methylmorpholine in 50 milliliters of tetrahydrofuran. This solution was chilled to −12° C., and 6.70 milliliters (0.050 mole) of isobutyl chloroformate was added. After 60 seconds (activation time) this chilled solution was added to another solution, which had been prepared immediately beforehand and was at 20° C. at the time of addition, of 24.42 grams (0.050 mole) of CH₃SO₃H·xH·Tyr·ONB, L-tyrosine p-nitrobenzyl ester p-toluenesulfonic acid salt, in 100 milliliters of dimethylformamide. The resulting mixture was left overnight at 0° C.

The next day the reaction mixture was added to 1 liter of water, and the resulting mixture, a gummy precipitate and supernatant water, was refrigerated overnight.

The next day (the gum not having crystallized) the supernatant water was decanted and the gummy residue was dissolved in 500 milliliters of ethyl acetate.

The ethyl acetate solution was successively washed with water, aqueous sodium bicarbonate solution and then again with water. The washed ethyl acetate solution was then dried over anhydrous sodium sulfate.

Thin layer chromatography using the system 95 parts ethyl acetate: 5 parts ethanol showed a heavy ultra violet positive spot at the front, and the same very heavy spot at the front positive to tolidine-chlorine. There was a faint tolidine-chlorine positive spot at $R_f$ 0.40.

The ethyl acetate solution was evaporated in an open dish, leaving a yellow oil. The oil was dried by applying a low vacuum, leaving a "cotton candy" residue. The final yield of dried product was 21.5 grams, 91.4% of the theoretical yield.

Thin layer chromatography using the system 8 parts n-heptane: 2 parts isopropanol gave a spot at $R_f$ 0.47 positive to both ultra violet and tolidine-chlorine, but negative to ninhydrin.

The above reaction was repeated, and the product was dried under high vacuum over phosphorus pentoxide. The yield was 24.2 grams, substantially quantitative, melting at 70–72° C.

EXAMPLE 57

Preparation of L-alanyl-L-tyrosine p-nitrobenzyl ester hydrochloride $$\text{BOC·Ala·Tyr·ONB} \xrightarrow[+\text{HCL}]{\text{R.T.}} \text{HCl}x\text{H·Ala·Tyr·ONB (L,L)}$$

EXAMPLE 58

Preparation of BOC·Ser·Ala·Tyr·ONB (L,L,L), t-butyloxycarbonyl - L - seryl - L - alanyl - L - tyrosine p-nitro-benzyl ester $$\text{HCl}x\text{H·Ala·Tyr·ONB} + \text{BOC·Ser·OH} \xrightarrow[\text{M.A.}]{-13° \text{ C. to R.T.}} \text{BOC·Ser·Ala·Tyr·ONB}$$

A 2.05 gram (5 millimole) portion of BOC·Ser·OH (t-butyloxycarbonyl-L-serine) and a 1.10 milliliter (10 millimole) portion of N-methylmorpholine were added to 20 milliliters of tetrahydrofuran and stirred. The solution was filtered to remove insoluble material contained in the product. The solution was cooled to −13° C. and 0.67 milliliters (5 millimole) of isobutyl chloroformate was added. Thirty seconds later, a solution of 2.12 grams (5 millimoles) of HClxH·Ala·Tyr·ONB (L-alanyl-L-tyrosine p-nitrobenzyl ester hydrochloride) in 15 milliliters of tetrahydrofuran at 5° C. was added. The mixture was stirred for one hour. The product was isolated as a gum and dried. Thin layer chromatography of the product using the solvent system n-butanol:acetic acid:water (40:4:12) was used to follow the reaction. The sharp diminution of spot intensity at $R_f$ 0.58 (HClxH·Ala·Tyr·ONB) and emergence of a strong spot from $R_f$ 0.73 to 0.92 indicated the reaction to be essentially complete.

EXAMPLE 59

Preparation of t-butyloxycarbonyl-L-seryl-L-alanyl-L-tyrosine $$\text{BOC·Ser·Ala·Tyr·ONB} \xrightarrow{\text{R.T.}} \text{BOC·Ser·Ala·Tyr·OH (L,L,L)}$$

EXAMPLE 60

Preparation of t-butyloxycarbonyl-L-seryl-L-alanyl-L-tyrosyl - L - tryptophanyl - $N^G$ - nitro - L - arginyl-L-asparaginyl - L - leucyl - L - asparaginyl - L -phenylalanyl - L - histidyl - N - nitro - L - arginyl - L - phenylalanine p-nitrobenzyl ester $$\text{BOC·Ser·Ala·Tyr·OH} + \text{H·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·ONB} \xrightarrow{\text{R.T.}}_{\text{DCCD + HOSu}}$$

$$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·ONB (L,L,L,L,L,L,L,L,L,L,L,L)}$$

EXAMPLE 61

Preparation of t-butyloxycarbonyl - L - seryl - L - alanyl-L-tyrosyl - L - tryptophanyl - L - $N^G$ - nitro - L - arginyl-L-asparaginyl - L - leucyl - L - asparaginyl - L - asparaginyl - L - phenylalanyl - L - histidyl - N - nitro-L-arginyl-L-phenylalanine $$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·ONB} \xrightarrow[\text{H}_2,\text{Pd}]{\text{R.T.}}$$

$$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·OH (L,L,L,L,L,L,L,L,L,L,L,L)}$$

EXAMPLE 62

Preparation of t-butyloxycarbonyl - L - seryl - L - alanyl-L-tyrosyl - L - tryptophanyl - $N^G$ - nitro - L - arginyl-L-asparaginyl - L - leucyl - L - asparaginyl - L - asparaginyl - L - phenylalanyl - L - histidyl - N - nitro - L - arginyl - L - phenylalanyl - O - benzyl - L -serylglycyl-L-methinonine amide $$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·OH} + \text{TFA}x\text{H·}\overset{\overset{OBzl}{|}}{\text{Ser}}\text{·Gly·Met·NH}_2 \xrightarrow[\text{DCCD + HOSu}]{\text{R.T.}}$$

$$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·}\overset{\overset{OBzl}{|}}{\text{Ser}}\text{·Gly·Met·NH}_2 \text{ (L,L,L,L,L,L,L,L,L,L,L,L,L)}$$

EXAMPLE 63

Preparation of L-seryl-L-alanyl-L-tyrosyl-L-tryptophenyl-$N^G$-nitro - L - arginyl - L - asparaginyl - L - leucyl-L-asparaginyl - L - asparaginyl - L - phenylalanyl - L-histidyl - $N^G$ - nitro - L - arginyl - L - phenylalanyl-O-benzyl - L - serylglycyl - L - methionine amide trifluoroacetate $$\text{BOC·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·}\overset{\overset{OBzl}{|}}{\text{Ser}}\text{·Gly·Met·NH}_2 \xrightarrow[+\text{TFA}]{\text{R.T.}}$$

$$\text{TFA}x\text{H·Ser·Ala·Tyr·Try·}\overset{\overset{NO_2}{|}}{\text{Arg}}\text{·Asn·Leu·Asn·Asn·Phe·His·}\overset{\overset{NO_2}{|}}{\text{Arg}}\text{·Phe·}\overset{\overset{OBzl}{|}}{\text{Ser}}\text{·Gly·Met·NH}_2 \text{ (L,L,L,L,L,L,L,L,L,L,L,L,L)}$$

EXAMPLE 64

Preparation of t-butyloxycarbonyl-S-benzyl-L-cysteinyl-O-benzyl - L - seryl - L - asparaginyl - L - leucyl - O-benzyl - L - seryl - L - threonyl - S - benzyl - L - cysteinyl-L-valyl - L - leucyl - L - seryl - L - alanyl-L-tyrosyl-L-tryptophanyl - N$^G$ - nitro - L - arginyl - L - asparaginyl - L - leucyl - L - asparaginyl - L - asparaginyl-L-phenylalanyl - L - histidyl - N$^G$ - nitro - L - arginyl-L-phenylalanyl - O - benzyl - L - serylglycyl - L - methionine amide $$\begin{array}{c} \text{SBzl} \quad \text{OBzl} \quad \text{OBzl} \quad \text{SBzl} \quad\quad\quad\quad\quad\quad\quad \text{NO}_2 \quad\quad\quad \text{NO}_2 \quad \text{OBzl} \\ \text{BOC·Cys·Ser·Asn·Leu·Ser·Thr·Cys·Val·Leu·OSu} + \text{H·Ser·Ala·Tyr·Try·Arg·Asn·Leu·Asn·Asn·Phe·His·Arg·Phe·Ser·Gly·Met·NH}_2 \xrightarrow{\text{R.T.}} \end{array}$$

$$\begin{array}{c} \text{SBzl} \quad \text{OBzl} \quad \text{OBzl} \quad \text{SBzl} \quad\quad\quad\quad\quad\quad\quad \text{NO}_2 \quad\quad\quad \text{NO}_2 \\ \text{BOC·Cys·Ser·Asn·Leu·Ser·Thr·Cys·Val·Leu·Ser·Ala·Tyr·Try·Arg·Asn·Leu·Asn·Asn·Phe·His·Arg·} \\ \text{OBzl} \\ \text{Phe·Ser·Gly·Met·NH}_2 \quad (L,L,L,L,L,L,L,L,L,L,L,L,L,L,L,L,L,L,L,L,L,L,L) \end{array}$$

EXAMPLE 65

Preparation of t-butyloxycarbonyl-O-benzyl-L-serylglycine methyl ester $$\text{BOC·Ser·OH} + \text{HClxH·Gly·OMe} \xrightarrow[\text{M.A.}]{-15°\text{C. to R.T.}} \text{BOC·Ser·Gly·OMe (L)} \quad (\text{OBzl})$$

EXAMPLE 66

Preparation of t-butyloxycarbonyl-O-benzyl-L-serylglycine $$\text{BOC·Ser·Gly·OMe} \xrightarrow[\text{NaOH}]{\text{R.T.}} \text{BOC·Ser·Gly·OH (L)} \quad (\text{OBzl})$$

EXAMPLE 67

Preparation of BOC·Ser·Gly·Met·OMe (L,L), t-butyloxycarbonyl-O-benzyl-L-serylglycyl-L-methionine methyl ester $$\text{BOC·Ser·Gly·OH} + \text{HClxH·Met·OMe} \longrightarrow \text{BOC·Ser·Gly·Met·OMe} \quad (\text{OBzl})$$

2.40 grams (0.007 mole) of

BOC·Ser·Gly·OH (OBzl)

t-butyloxycarbonyl-O-benzyl-L-serylglycine, was dissolved in a solution of 1.54 milliliters (0.014 mole) of N-methylmorpholine in 25 milliliters of tetrahydrofuran.

Another solution was prepared of 1.4 grams (0.007 mole) of HClxH·Met·OMe, L-methionine methyl ester hydrochloride in 5 milliliters of dimethylacetamide.

Then, 0.93 milliliter (0.007 mole) of isobutyl chloroformate was added to the first of the two solutions (tetrahydrofuran) above, and the resulting solution was allowed two minutes of activation time at −13°C., after which the two solutions were combined. The resulting mixture was allowed to stand overnight.

The next morning the solvent tetrahydrofuran was removed under vacuum, and the residue was then shaken into a mixture of 75 milliliters of ethyl acetate and 50 milliliters of water. The resulting ethyl acetate layer was separated and then washed successively with dilute aqueous phosphoric acid, water, dilute aqueous sodium bicarbonate solution, and water. The washed ethyl acetate solution was then dried over anhydrous sodium sulfate. Thin layer chromatography on silica of this ethyl acetate solution using the solvent system 1 part isopropanol: 1 part n-heptane gave a spot at $R_f$ 0.74 positive to ultra violet (very strong), positive to tolidine-chlorine (heavy, brown-yellow) and positive for divalent sulfur (very strong).

The ethyl acetate was evaporated, first under low vacuum, then pump vacuum, leaving 3.40 grams of product, equivalent to a 97% yield.

EXAMPLE 68

Preparation of t-butyloxycarbonyl-O-benzyl-L-serylglycyl-L-methionine $$\text{BOC·Ser·Gly·Met·OMe} \xrightarrow[\text{NaOH}]{\text{R.T.}} \text{BOC·Ser·Gly·Met·OH (L,L)} \quad (\text{OBzl})$$

EXAMPLE 69

Preparation of t-butyloxycarbonyl-O-benzyl-L-serylglycyl-L-methionine amide $$\text{BOC·Ser·Gly·Met·OH} \xrightarrow[\text{M.A., NH}_3]{-10°\text{C. to R.T.}} \text{BOC·Ser·Gly·Met·NH}_2 \text{ (L,L)} \quad (\text{OBzl})$$

EXAMPLE 70

Preparation of O-benzyl-L-serylglycyl-L-methionine amide trifluoroacetate $$\text{BOC·Ser·Gly·Met·NH}_2 \xrightarrow[+\text{TFA}]{\text{R.T.}} \text{TFAxH·Ser·Gly·Met·NH}_2 \text{ (L,L)} \quad (\text{OBzl})$$

EXAMPLE 71

Preparation of t-butyloxycarbonyl-S-benzyl-L-cysteinyl-O-benzylseryl - L - asparaginyl-L-leucyl-O-benzyl-L-seryl-L-threonyl - S - benzyl-L-cysteinyl-L-valyl-L-leucyl-L-seryl - L - alanyl-L-tyrosyl-L-tryptophanyl-N$^G$-nitro-L-arginyl - L asparaginyl - L - leucyl-L-asparaginyl-L-asparaginyl - L - phenylalanyl-L-histidyl-N$^G$-nitro-L-arginyl-L-phenylalanine amide $$\begin{array}{c} \text{SBzl} \quad \text{OBzl} \quad \text{OBzl} \quad \text{SBzl} \quad\quad\quad\quad\quad\quad\quad \text{NO}_2 \quad\quad\quad\quad \text{NO}_2 \\ \text{BOC·Cys·Ser·Asn·Leu·Ser·Thr·Cys·Val·Leu·Ser·Ala·Tyr·Try·Arg·Asn·Leu·Asn·Asn·Phe·His·Arg·Phe·ONB} \xrightarrow[+\text{NH}_3]{\text{R.T.}} \end{array}$$

$$\begin{array}{c} \text{SBzl} \quad \text{OBzl} \quad \text{OBzl} \quad \text{SBzl} \quad\quad\quad\quad\quad\quad\quad \text{NO}_2 \quad\quad\quad\quad \text{NO}_2 \\ \text{BOC·Cys·Ser·Asn·Leu·Ser·Thr·Cys·Val·Leu·Ser·Ala·Tyr·Try·Arg·Asn·Leu·Asn·Asn·Phe·His·Arg·} \\ \text{Phe·NH}_2 \quad (L,L,L,L,L,L,L,L,L,L,L,L,L,L,L,L,L,L,L,L,L) \end{array}$$

EXAMPLE 72

Preparation of L-cysteinyl-L-seryl-L-asparaginyl-L-leucyl-L - seryl - L - threonyl-L-cysteinyl-L-valyl-L-leucyl-L-seryl - L - alanyl-L-tyrosyl-L-tryptophanyl-L-arginyl-L-asparaginyl - L - leucyl-L-asparaginyl-L-asparaginyl-L-phenylalanyl - L - histidyl - L - arginyl-L-phenylalanine amide

```
          SBzl  OBzl   OBzl  SBzl              NO₂                    NO₂
           |    /       |    |                  |                      |              −60° C. to R.T.
BOC·Cys·Ser·Asn·Leu·Ser·Thr·Cys·Val·Leu·Ser·Ala·Tyr·Try·Arg·Asn·Leu·Asn·Asn·Phe·His·Arg·Phe·NH₂  ──────────────→
                                                                                                       +HF
```
H·Cys·Ser·Asn·Leu·Ser·Thr·Cys·Val·Leu·Ser·Ala·Tyr·Try·
Arg·Asn·Leu·Asn·Asn·Phe·His·Arg·Phe·NH₂ (L,L,L,L,L,L,L,L,L,L,L,L,L,L,L,L,L,L,L,L,L)

EXAMPLE 73

Preparation of L-cysteinyl-L-seryl-L-asparaginyl-L-leucyl-L - seryl - L threonyl - L - cysteinyl - L - valyl-L-leucyl-seryl - L - alanyl-L-tyrosyl-L-tryptophanyl-L-arginyl-L-asparaginyl - L - leucyl-L-asparaginyl-L-asparaginyl-L-phenylalanyl - L - histidyl-L-arginyl-L-phenylalanyl-L-serylglycyl-L-methionine amide trihydrofluoride

```
                              OBzl
                               |                    R.T.               OBzl
                               |                ──────────→             |
BOC·Ser·OSu + H·Gly·Met·Gly·Phe·Gly·Pro·OH                  BOC·Ser·Gly·Met·Gly·Phe·Gly·Pro·OH (L,L,L,L)
```

EXAMPLE 74

Preparation of L-cysteinyl-L-seryl-L-asparaginyl-L-leucyl-L - seryl - L - threonyl-L-cysteinyl-L-valyl-L-leucyl-L-seryl - L - alanyl-L-tyrosyl-L-tryptophanyl-L-arginyl-L-asparaginyl - L - leucyl - L-asparaginyl-L-asparaginyl-L-phenylalanyl - L - histidyl-L-arginyl-L-phenylarginyl-L-serylglycyl-L-methionine amide trihydrofluoride

```
          SBzl  OBzl   OBzl  SBzl              NO₂                    NO₂   OBzl                      −10° C
           |    /       |    |                  |                      |     |                         to R.T.
BOC·Cys·Ser·Asn·Leu·Ser·Thr·Cys·Val·Leu·Ser·Ala·Tyr·Try·Arg·Asn·Leu·Asn·Asn·Phe·His·Arg·Phe·Ser·Gly·Met·Gly·Phe·Gly·Pro·NH₂  ────→
                                                                                                                              +HF
```
HFxH·Cys·Ser·Asn·Leu·Ser·Thr·Cys·Val·Leu·Ser·Ala·Tyr·Try·Arg·Asn·Leu·Asn·Asn·Phe·His·Arg·Phe·Ser·Gly·
Met·Gly·Phe·Gly·Pro·NH₂ (L,L,L,L,L,L,L,L,L,L,L,L,L,L,L,L,L,L,L,L,L,L,L,L,L)

EXAMPLE 75

Preparation of benzyloxycarbonylglycyl - L-phenylalanyl-glycyl-L-proline t-butyl ester

```
                          −15° C. to 0° C.
Z·Gly·Phe·Gly·OH + H·Pro·O-t-Bu  ──────────────→  Z·Gly·Phe·Gly·Pro·O-t-Bu (L,L)
```

EXAMPLE 76

Preparation of glycyl-L-phenylalanylglycyl-L-proline t-butyl ester hydrochloride

```
                         R.T.
Z·Gly·Phe·Gly·Pro·O-t-Bu  ────→  HClxH·Gly·Phe·Gly·Pro·O-t-Bu (L,L)
                         +HCl
```

EXAMPLE 77

Preparation of t-butyloxycarbonylglycyl-L-methionyl-glycyl-L-phenylalanylglycyl-L-proline t-butyl ester

```
                                        R.T.
BOC·Gly·Met·OH + HClxH·Gly·Phe·Gly·Pro·O-t-Bu  ──────────→  BOC·Gly·Met·Gly·Phe·Gly·Pro·O-t-Bu (L,L,L)
                                      DCCD + HOSu
```

EXAMPLE 78

Preparation of glycyl-L-methionylglycyl-L-phenylalanyl-glycyl-L-proline hydrochloride

```
                                  R.T.
BOC·Gly·Met·Gly·Phe·Gly·Pro·O-t-Bu  ──────→  HClxH·Gly·Met·Gly·Phe·Gly·Pro·OH (L,L,L)
                                HCl + HOAc
```

EXAMPLE 79

Preparation of t-butyloxycarbonyl-O-benzyl-L-serylglycyl-L - serylglycyl - L - methionylglycyl-L-phenylalanylgycyl-L-proline

```
                               OBzl
                                |                   R.T.              OBzl
                                |                 ──────→              |
BOC·Ser·OSu + H·Gly·Met·Gly·Phe·Gly·Pro·OH                BOC·Ser·Gly·Met·Gly·Phe·Gly·Pro·OH (L,L,L,L)
```

EXAMPLE 80

Preparation of t-butyloxycarbonyl-O-benzyl-L-serylglycyl-L - methionylglycyl - L - phenylalanylglycyl - L-proline amide

```
          OBzl
           |                          −10° C. to R.T.          OBzl
           |                          ──────────────→           |
BOC·Ser·Gly·Met·Gly·Phe·Gly·Pro·OH         M.A. NH₃       BOC·Ser·Gly·Met·Gly·Phe·Gly·Pro·NH₂ (L,L,L,L)
```

EXAMPLE 81

Preparation of O-benzyl-L-serylglycyl-L-methionylglycyl-L-phenylalanylglycyl-L-proline amide hydrochloride

```
          OBzl                                                OBzl
           |                          R.T.                     |
BOC·Ser·Gly·Met·Gly·Phe·Gly·Pro·NH₂  ──────→  HClxH·Ser·Gly·Met·Gly·Phe·Gly·Pro·NH₂ (L,L,L,L)
                                    HCl + HOAc
```

EXAMPLE 82

Preparation of t - butyloxycarbonyl - O-benzyl-L-seryl-L-threonyl - S - benzyl - L - cysteinyl - L-valyl-L-leucyl-L-seryl - L - alanyl - L - tyrosyl-L-tryptophanyl-N^G-nitro-L - arginyl - L - asparaginyl-L-leucyl-L-asparaginyl-L-asparaginyl - L - phenylalanyl - L - histidyl - N^G - nitro-L-arginyl-1-phenylalanine p-nitrobenzyl ester

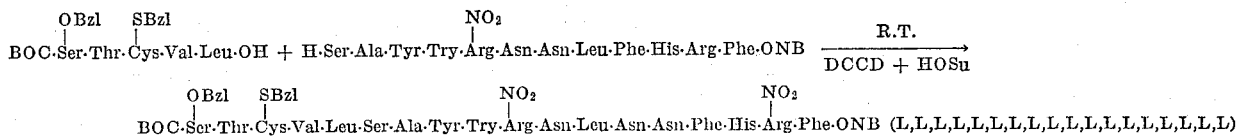

EXAMPLE 83

Preparation of O - benzyl - L-seryl-L-threonyl-S-benzyl-L-cysteinyl - L - valyl - L - leucyl - L - seryl - L - alanyl-L-tyrosyl - L - tryptophanyl-N^G-nitro-L-arginyl-L-asparaginyl - L - leucyl - L-asparaginyl-L-asparaginyl-L-phenylalanyl - L - histidyl-N-nitro-L-arginyl-L-phenylalanine p-nitrobenzyl ester

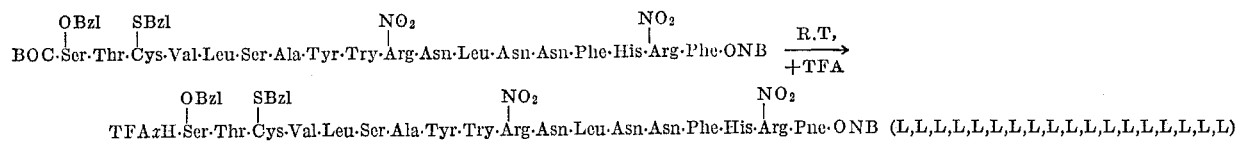

EXAMPLE 84

Preparation of t-butyloxycarbonyl-S-benzyl-L-cysteinyl-O-benzyl - L - seryl - L - asparaginyl-L-leucyl-O-benzyl-L-seryl - L - threonyl - S - benzyl - L-cysteinyl-L-valyl-L-leucyl - L - seryl - L - alanyl-L-tyrosyl-L-tryptophanyl-L - N^G - nitro - L - arginyl - L - asparaginyl-L-leucyl-L-asparaginyl - L - asparaginyl-L-phenylalanyl-L-histidyl-N^G-nitro-L-arginyl-L-phenylalanine p-nitrobenzyl ester

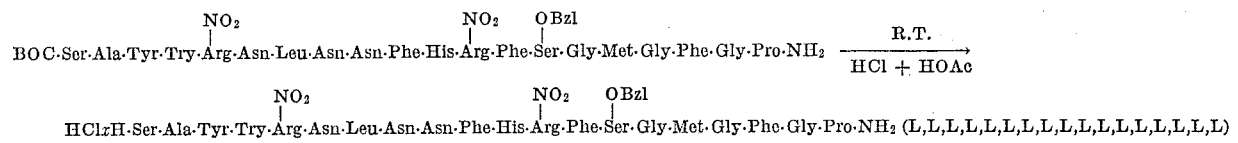

EXAMPLE 85

Preparation of t - butyloxycarbonyl - L-seryl-L-alanyl-L-tyrosyl - L - tryptophanyl - N^G - nitro - L - arginyl - L - asparaginyl - L - leucyl - L - asparaginyl-L-asparaginyl-L - phenylalanyl - L - histidyl - N^G - nitro-L-arginyl-L-phenylalanyl - O - benzyl - L - serylglycyl-L-methionylglycyl-L-phenylalanylglycyl-L-proline amide

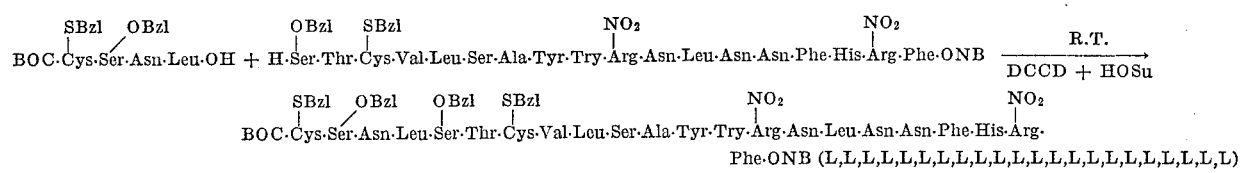

EXAMPLE 86

Preparation of L-seryl-L-alanyl-L-tyrosyl-L-tryptophanyl-N^G - nitro - L - arginyl - L - asparaginyl-L-leucyl-L-asparaginyl - L - asparaginyl-L-phenylalanyl-L-histidyl-N^G - nitro-L-arginyl-L-phenylalanayl-O-benzyl-L-serylglycyl - L-methionylglycyl-L-phenylalanylglycyl-L-proline amide

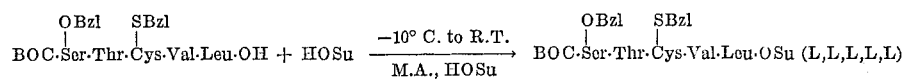

EXAMPLE 87

Preparation of t - butyloxycarbonyl-O-benzyl-L-seryl-L-threonyl - S-benzyl-L-cysteinyl-L-valyl-L-leucine N-hydroxysuccinimide ester and t - butyloxycarbonyl - O-benzyl-L-seryl-L-threonyl-S-benzyl - L - cysteinyl-L-valyl-L-leucyl-L-seryl-L-alanyl-L - tyrosyl - L - tryptophanyl-N^G-nitro-L-arginyl-L-asparaginyl - L - leucyl - L-asparaginyl-L-asparaginyl-L-phenylalanyl - L - histidyl-N^G-nitro-L-arginyl-L-phenylalanyl - O - benzyl - L-serylglycl-L-methionylglycyl-L-phenylalanylglycyl-L-proline amide

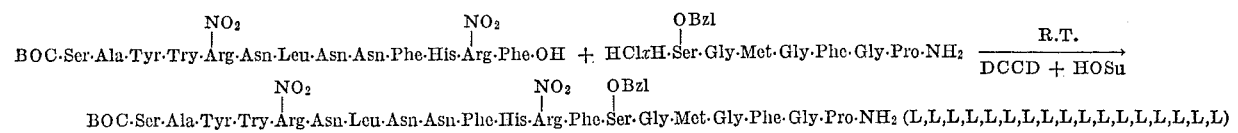

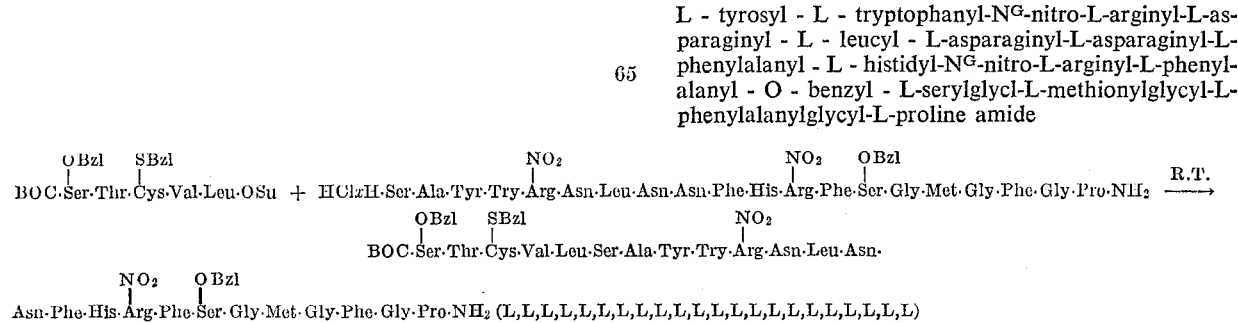

EXAMPLE 88

Preparation of O - benzyl-L-seryl-L-theonyl-S-benzyl-L-cysteinyl - L-valyl-L-leucyl-L-seryl-L-alanyl-L-tyrosyl-L - tryptophanyl - $N^G$ - nitro-L-arginyl-asparaginyl-L-leucyl - L - asparaginyl - L-asparaginyl-L-phenylalanyl-L - histidyl - $N^G$ - nitro - L-arginyl-L-phenylalanyl-O-benzyl - L - serylglycyl - L-methionylglycyl-L-phenylalanylglycyl-L-proline amide trifluoroacetate $$\overset{OBzl}{\underset{|}{BOC\text{-}Ser}}\text{-}Thr\text{-}\overset{SBzl}{\underset{|}{Cys}}\text{-}Val\text{-}Leu\text{-}Ser\text{-}Ala\text{-}Tyr\text{-}\overset{NO_2}{\underset{|}{Try\text{-}Arg}}\text{-}Asn\text{-}Leu\text{-}Asn\text{-}Asn\text{-}$$

$$\overset{NO_2}{\underset{|}{Phe\text{-}His\text{-}Arg}}\text{-}Phe\text{-}\overset{OBzl}{\underset{|}{Ser}}\text{-}Gly\text{-}Met\text{-}Gly\text{-}Phe\text{-}Gly\text{-}Pro\text{-}NH_2 \xrightarrow[TFA]{R.T.} TFAxH\text{-}\overset{OBzl}{\underset{|}{Ser}}\text{-}Thr\text{-}\overset{ZBzl}{\underset{|}{Cys}}\text{-}Val\text{-}Leu\text{-}Ser\text{-}Ala\text{-}Tyr\text{-}\overset{NO_2}{\underset{|}{Try\text{-}Arg}}\text{-}Asn\text{-}Leu\text{-}Asn\text{-}$$

$$\overset{NO_2}{\underset{|}{Asn\text{-}Phe\text{-}His\text{-}Arg}}\text{-}Phe\text{-}\overset{OBzl}{\underset{|}{Ser}}\text{-}Gly\text{-}Met\text{-}Gly\text{-}Phe\text{-}Gly\text{-}Pro\text{-}NH_2 \; (L,L,L,L,L,L,L,L,L,L,L,L,L,L,L,L,L,L,L,L,L)$$

EXAMPLE 89

Preparation of t - butyloxycarbonyl-S-benzyl-L-cysteinyl-O - benzyl - L-seryl-L-asparaginyl-L-leucyl-O-benzyl-L-seryl - L - threonyl - S-benzyl-L-cysteinyl-L-valyl-L-leucyl - L - seryl-L-alanyl-L-tyrosyl-L-tryptophanyl-$N^G$-nitro - L-arginyl-L-asparaginyl-L-leucyl-L-asparaginyl-L - asparaginyl - L-phenylalanyl-L-histidyl-$N^G$-nitro-L-arginyl - L - phenylalanyl - O-benzyl-L-serylglycyl-L-methionylglycyl-L-phenylalanylglycyl-L-proline amide $$\overset{ZBzl}{\underset{|}{BOC\text{-}Cys}}\text{-}\overset{OBzl}{\underset{|}{Ser}}\text{-}Asn\text{-}Leu\text{-}OSu + TFAxH\text{-}\overset{OBzl}{\underset{|}{Ser}}\text{-}Thr\text{-}\overset{ZBzl}{\underset{|}{Cys}}\text{-}Val\text{-}Leu\text{-}Ser\text{-}Ala\text{-}Tyr\text{-}$$

$$\overset{NO_2}{\underset{|}{Try\text{-}Arg}}\text{-}Asn\text{-}Leu\text{-}Asn\text{-}Asn\text{-}Phe\text{-}His\text{-}\overset{NO_2}{\underset{|}{Arg}}\text{-}Phe\text{-}\overset{OBzl}{\underset{|}{Ser}}\text{-}Gly\text{-}Met\text{-}Gly\text{-}Phe\text{-}Gly\text{-}Pro\text{-}NH_2 \xrightarrow{R.T.}$$

$$\overset{ZBzl}{\underset{|}{BOC\text{-}Cys}}\text{-}\overset{OBzl}{\underset{|}{Ser}}\text{-}Asn\text{-}Leu\text{-}Ser\text{-}Thr\text{-}\overset{ZBzl}{\underset{|}{Cys}}\text{-}Val\text{-}Leu\text{-}Ser\text{-}Ala\text{-}Tyr\text{-}Try\text{-}\overset{NO_2}{\underset{|}{Arg}}\text{-}$$

$$Asn\text{-}Leu\text{-}Asn\text{-}Asn\text{-}Phe\text{-}His\text{-}\overset{NO_2}{\underset{|}{Arg}}\text{-}Phe\text{-}\overset{OBzl}{\underset{|}{Ser}}\text{-}Gly\text{-}Met\text{-}Gly\text{-}Phe\text{-}Gly\text{-}Pro\text{-}NH_2 \; (L,L,L,L,L,L,L,L,L,L,L,L,L,L,L,L,L,L,L,L,L,L)$$

EXAMPLE 90

Preparation of t-butyloxycarbonyl-O-benzyl-L-serine N-hydroxysuccinimide ester $$\overset{OBzl}{\underset{|}{BOC\text{-}Ser\text{-}OH}} \xrightarrow[M.A.\;HOSu]{-15°\;C.\;to\;50°\;C.} \overset{OBzl}{\underset{|}{BOC\text{-}Ser\text{-}OSu}} \; (L)$$

EXAMPLE 91

Preparation of t-butyloxycarbonyl-L-alanine N-hydroxysuccinimide ester $$BOC\text{-}Ala\text{-}OH + HOSu \xrightarrow[M.A.]{-10°\;C.\;to\;45°\;C.} BOC\text{-}Ala\text{-}OSu \; (L)$$

EXAMPLE 92

Preparation of t-butyloxycarbonyl-L-tyrosine $$H\text{-}Tyr\text{-}OH + N_3\text{-}\overset{\overset{CH_3}{|}}{\underset{\underset{CH_3}{|}}{C}}\text{-}O\overset{}{\underset{\underset{O}{\|}}{C}}\text{-}CH_3 \xrightarrow{Reflux\;t\text{-}butanol} BOC\text{-}Tyr\text{-}OH \; (L)$$

EXAMPLE 93

Preparation of t-butyloxyoxycarbonyl-L-tyrosine N-hydroxysuccinimide ester $$BOC\text{-}Tyr\text{-}OH \xrightarrow[+\;HOSu,\;M.A.]{-12°\;C.\;to\;reflux\;ETOAc} BOC\text{-}Tyr\text{-}OSu \; (L)$$

EXAMPLE 94

Preparation of t-butyloxycarbonyl-L-tyrosyl-L-tryptophane $$BOC\text{-}Tyr\text{-}OSu + H\text{-}Try\text{-}OH \xrightarrow{20°\;C.\;to\;R.T.} BOC\text{-}Tyr\text{-}Try\text{-}OH \; (L,L)$$

EXAMPLE 95

Preparation of L-tyrosyl-L-tryptophane $$BOC\text{-}Tyr\text{-}Try\text{-}OH \xrightarrow[HCl\;+\;HOAc]{-10°\;C.\;to\;R.T.} \xrightarrow[+\;NH_3]{R.T.} H\text{-}Tyr\text{-}Try\text{-}OH \; (L,L)$$

EXAMPLE 96

Preparation of t-butyloxycarbonyl-L-alanyl-L-tyrosyl-L-tryptophane $$BOC\text{-}Ala\text{-}OSu + H\text{-}Tyr\text{-}Try\text{-}OH \xrightarrow{R.T.} BOC\text{-}Ala\text{-}Tyr\text{-}Try\text{-}OH \; (L,L,L)$$

EXAMPLE 97

Preparation of L-alanyl-L-tyrosyl-L-tryptophane hydrochloride $$BOC\text{-}Ala\text{-}Tyr\text{-}Try\text{-}OH \xrightarrow[HCl\;+\;HOAc]{10°\;C.\;R.T.} HClxH\text{-}Ala\text{-}Tyr\text{-}Try\text{-}OH \; (L,L,L)$$

EXAMPLE 98

Preparation of t-butyloxycarbonyl-O-benzyl-L-seryl-L-alanyl-L-tyrosyl-L-tryptophane $$\overset{OBzl}{\underset{|}{BOC\text{-}Ser\text{-}OSu}} + HClxH\text{-}Ala\text{-}Tyr\text{-}Try\text{-}OH \xrightarrow{R.T.} \overset{OBzl}{\underset{|}{BOC\text{-}Ser\text{-}Ala\text{-}Tyr\text{-}Try\text{-}OH}} \; (L,L,L,L)$$

EXAMPLE 99

Preparation of t-butyloxycarbonyl-N^G-nitro-L-arginyl-L-asparaginyl-L-leucine N-hydroxysuccinimide ester

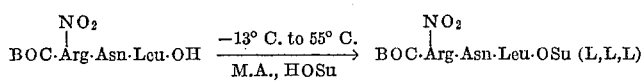

EXAMPLE 100

Preparation of t-butyloxycarbonyl-N^G-nitro-L-arginyl-L-asparaginyl-L-leucine amide

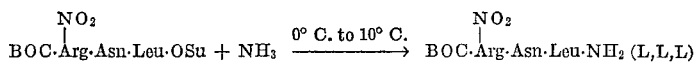

EXAMPLE 101

Preparation of N^G-nitro-L-arginyl-L-asparaginyl-L-leucine amide trifluoroacetate

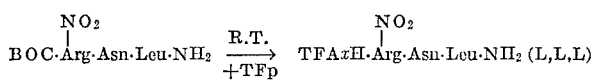

EXAMPLE 102

Preparation of BOC·Ser·Ala·Tyr·Try·Arg·Asn·Leu·NH$_2$ (L,L,L,L,L,L,L), t-butyloxycarbonyl-O-benzyl-L-seryl - L - alanyl-L-tyrosyl-L-tryptophanyl-N^G-nitro-L-arginyl - L - asparaginyl-L-leucine amide

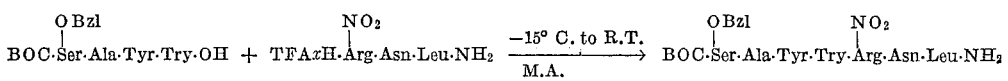

A solution of 1.24 grams (1.54 mmoles) of

BOC·Ser·Ala·Tyr·Try·OH t-butyloxycarbonyl-O-benzyl-L-seryl-L-alanyl - L - tyrosyl-L-tryptophane, in 15 milliliters of tetrahydrofuran was stirred and chilled in a −15° C. bath. Then 0.35 milliliter (3.08 mmoles) of N-methylmorpholine was added, followed within a few minutes by addition of 0.21 milliliter (1.54 mmoles) of isobutyl chloroformate.

An immediate precipitate formed. After 1 minute a solution of 0.86 gram (1.54 mmoles) of the TFA salt, N^G-nitro-L-arginyl-L-asparaginyl-L-leucine amide trifluoroacetate, in 5 milliliters of dimethylformamide was added (using an additional 1 milliliter of dimethylformamide as a rinse). The resulting solution was neutral (vapors) to general purpose pH paper, and, so, another equivalent (0.17 milliliter) of N-methylmorpholine was added, after which the vapors were basic. After 2 or 3 minutes the cooling bath was removed, and the reaction mixture was stirred for an additional 10 minutes. At this point, and also several hours later than layer chromatography of small aliquots of the reaction mixture on silica using the 40:20:4 solvent system showed about the same picture: strongest spot at R$_f$ 0.8, positive to ultraviolet, Ehrlich's reagent, and tolidine-chlorine (separate chromatographic plate); minor spots at R$_f$ 0.94 and 0.6; an additional minor tolidine-chlorine spot at R$_f$ 0.7.

The considerable amount of solid present, somewhat gelatinous, was separated by filtration, and then washed (with difficulty) with tetrahydrofuran, and then separately with several small portions of water, giving a yellow solid, batch A. Thin layer chromatography of this material on silica using the 40:20:4 solvent system and spotting the samples in dimethylformamide gave a strong spot at R$_f$ 0.8, positive to ultraviolet, Ehrlich's reagent, and tolidine-chlorine (2 plates); and faint similar spots at R$_f$ 0.95 and 0.6; a "head" on the R$_f$ 0.8 spot detected by Ehrlich's reagent only; and a faint spot positive to ultraviolet only at R$_f$ 0.2. The tetrahydrofuran-dimethylformamide filtrate showed the same spots, but the impurities were stronger. Consequently the filtrate was concentrated using a vacuum evaporator, and the resulting concentrate was treated with water and hydrochloric acid, and chilled, giving additional solid. This latter material was collected by filtration, washed with water and N aqueous sodium bicarbonate solution, and then again with water, batch B. Batch B was more strongly colored than batch A, but by thin layer chromatography showed the same major spot at R$_f$ 0.8, and trace spots at R$_f$ 0.6, 0.4 (tolidine-chlorine positive), and 0.95. Both A and B were dried overnight in a vacuum oven, weights: A, 0.88 gram; B, 0.86 gram.

B was stirred with a few milliliters of ethyl acetate, dissolving much of the color and causing the solid to become gelatinous. The solid was separated by filtration, and washed. The remaining solids were finally washed with methanol, and then dried, batch A'. Addition of ether to the methanol wash gave a little more solid, batch A''. Thin layer chromatography of both A' and A'' gave the R$_f$ 0.8 spot with the "head" line. A' and A'', after drying, were combined with A, making batch B', a total of 1.22 gram.

Finally a small additional amount of solid product was batch C. This product (0.19 gram) was combined with recovered from the methanol-ether filtrate from A'', the 1.22 grams of B', making a total of recovered product of 1.40 grams (79% of the theoretical 1.77 grams).

EXAMPLE 103

Preparation of O-benzyl - L - seryl-L-alanyl-L-tyrosyl-L-tryptophanyl-N^G-nitro - L - arginyl-L-asparaginyl - L-leucine amide trifluoroacetate

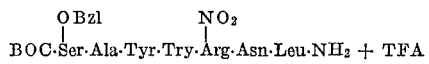 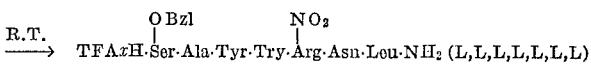

EXAMPLE 104

Preparation of t - butyloxycarbonyl-O-benzyl-L-seryl-L-threonyl-S-benzyl-L-cysteinyl-L-valyl - L - leucyl - O-benzyl-L-seryl-L-alanyl - L - tyrosyl - L - tryptophanyl-N^G-nitro-L-arginyl-L-asparaginyl-L-leucine amide

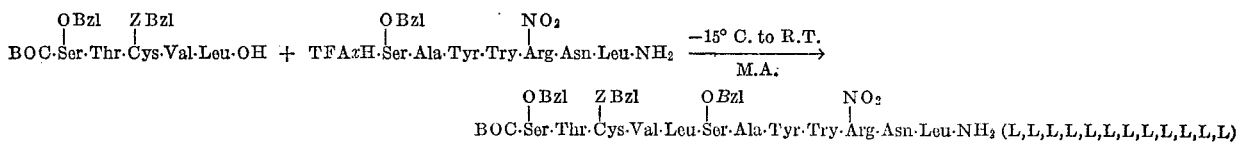

EXAMPLE 105

Preparation of O - benzyl-L-seryl-L-threonyl-S-benzyl-L-cysteinyl-L-valyl-L-leucyl-O-benzyl-L-seryl - L - alanyl-L-tyrosyl - L - tryptophanyl - N - nitro - L - arginyl-L-asparaginyl-L-leucine amide

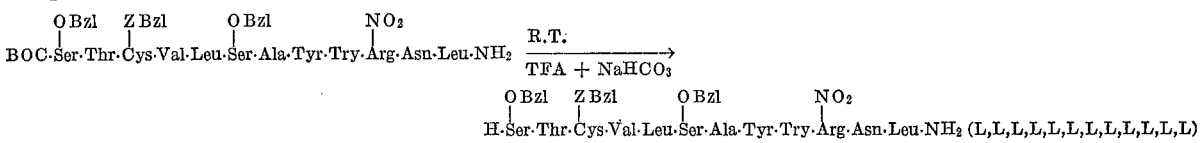

EXAMPLE 106

Preparation of t - butyloxycarbonyl-S-benzyl-L-cysteinyl-O-benzyl-L-seryl-L-asparaginyl-L-leucyl - O - benzyl-L-seryl-L-threonyl-S-benzyl - L - cysteinyl - L - valyl - L-leucyl-O-benzyl-L-seryl-L-alanyl-L-tyrosyl - L - tryptophanyl-N$^G$-nitro-L-arginyl-L-asparaginyl - L - leucine amide

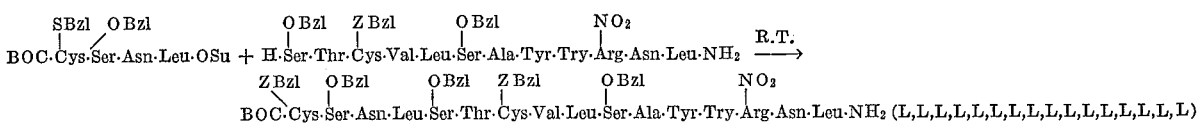

EXAMPLE 107

Preparation of L-cysteinyl-L-seryl - L - asparaginyl - L-leucyl-L-seryl-L-threonyl - L - cysteinyl - L - valyl-L-leucyl-L-seryl-L-alanyl-L-tyrosyl - L - tryptophanyl-L-arginyl-L-asparaginyl-L-leucine amide hydrofluoride

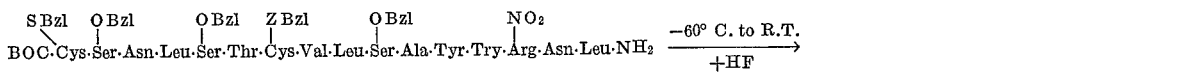

I claim:

1. In a process for the synthesis of peptides of naturally occurring α-amino acids by the mixed anhydride method wherein an amino blocked α-amino acid or peptide of α-amino acids, in which the blocking groups are benzyloxycarbonyl, tertiarybutyloxycarbonyl, triphenylmethyl, trifluoroacetyl or phthaloyl and in which other reactive groups are blocked, is reacted with an alkyl chloroformate at temperatures between about −5° C. and about −20° C. for from about ½ minute to about 15 minutes in the presence of a tertiary amine to produce a mixed anhydride and this anhydride is then reacted with an α-amino acid or peptide having a free amine group and a protected C-terminal carboxyl group to form a peptide, the improvement which comprises carrying out the mixed anhydride reaction with a primary lower alkyl chloroformate or secondary lower alkyl chloroformate and from 1 to about 2 equivalents of a tertiary amine selected from the group consisting of N - methylmorpholine and N,N'-dimethylpiperazine in the presence of a solvent selected from the group consisting of tetrahydrofuran, dimethoxyethane, N,N-dimethylacetamide, ethyl acetate, dioxolane, triethylphosphate and 5,5-dimethyldioxolane.

2. A process according to claim 1 in which the tertiary amine is N-methylmorpholine.

3. A process according to claim 1 in which the tertiary amine is N,N'-dimethylpiperazine.

4. In a process for the synthesis of peptides of naturally occurring α-amino acids by the mixed anhydride method wherein an amino blocked α-amino acid or peptide of α-amino acids, in which the block groups are benzyloxycarbonyl, tertiarybutyloxycarbonyl, triphenylmethyl, trifluoroacetyl or phthaloyl and in which other reactive groups are blocked, is reacted with an alkyl chloroformate at temperatures between about −5° C. and about −20° C. for from about ½ minute to about 15 minutes in the presence of a tertiary amine to produce a mixed anhydride and this anhydride is then reacted with an α-amino acid or peptide having a free amino group and a protected C-terminal carboxyl group to form a peptide, the improvement which comprises carrying out the mixed anhydride reaction by the use of a primary or secondary lower alkyl chloroformate and from 1 to about 2 equivalents of N-methylmorpholine in the presence of tetrahydrofuran.

References Cited

UNITED STATES PATENTS

| | | | |
|---|---|---|---|
| 2,713,574 | 7/1955 | Vaughan | 260—112.5 |
| 2,927,107 | 3/1960 | Velluz et al. | 260—112.5 |
| 3,264,281 | 8/1966 | Applewhite et al. | 260—112.5 |

OTHER REFERENCES

Albertson, Organic Reactions 12, 172–179, 187–195 (1962).

Anderson et al., J. Am. Chem. Soc. 88, 1338–1339 (1966).

Anderson et al., J. Am. Chem. Soc. 89, 5012–5017 (1967).

LEWIS GOTTS, Primary Examiner

M. KASSENOFF, Assistant Examiner

U.S. Cl. X.R.

260—268 DK, 309, 326.14 T, 326.3, 463

UNITED STATES PATENT OFFICE
CERTIFICATE OF CORRECTION

Patent No. 3,640,991         Dated  February 8, 1972

Inventor(s) Francis Marc Callahan

It is certified that error appears in the above-identified patent and that said Letters Patent are hereby corrected as shown below:

Column 2, formula No. 2, please change " $+ H_2N-A_2-\overset{\overset{O}{\|}}{C}-OS$ " to read -- $+ H_2N-A_2-\overset{\overset{O}{\|}}{C}-OZ$ --

Column 10, Example 17, line 11, please change "BOC·Ser·Ala·ONB" to read -- BOC·Ser·Ala·Tyr·ONB --

Column 15, Example 50, in the title, please change OBB" to read -- ONB --

Column 25, Example 89, line 32, please change "BOC·$\overset{ZBzl}{Cys}$·$\overset{OBzl}{Ser}$·Asn·Leu·OSu" to read -- BOC·$\overset{SBzl}{Cys}$·$\overset{OBzl}{Ser}$·Asn·Leu·OSu --

Also, line 37, please change "BOC·$\overset{ZBzl}{Cys}$·$\overset{OBzl}{Ser}$·Asn·Leu" to read -- BOC·$\overset{SBzl}{Cys}$·$\overset{OBzl}{Ser}$·Asn·Leu --

Column 28, Example 104, line 74, please change "BOC·$\overset{OBzl}{Ser}$·Thr·$\overset{ZBzl}{Cys}$·Val·Leu" to read -- BOC·$\overset{OBzl}{Ser}$·Thr·$\overset{SBzl}{Cys}$·Val·Leu --

Column 29, Example 105, line 7, please change "BOC·$\overset{OBzl}{Ser}$·Thr·$\overset{ZBzl}{Cys}$·Val·Leu" to read -- BOC·$\overset{OBzl}{Ser}$·Thr·$\overset{SBzl}{Cys}$·Val·Leu --

UNITED STATES PATENT OFFICE
CERTIFICATE OF CORRECTION

Patent No. 3,640,991  Dated February 8, 1972

Inventor(s) Francis Marc Callahan

It is certified that error appears in the above-identified patent and that said Letters Patent are hereby corrected as shown below:

Page 2

Column 29, Example 106, line 20, please change
"H·Ser·Thr(OBzl)·Cys(ZBzl)·Val·Leu" to read -- H·Ser·Thr(OBzl)·Cys(SBzl)·Val·Leu --

Also, line 22, please change "BOC·Cys(ZBzl)·Ser·Asn·Leu·Ser·Thr(ZBzl)·Cys(SBzl)·Val·Leu" to read -- BOC·Cys(ZBzl)·Ser·Asn·Leu·Ser·Thr(SBzl)·Cys(SBzl)·Val·Leu --

Column 29, Example 107, line 29, please change
"BOC·Cys(SBzl)·Ser(OBzl)·Asn·Leu·Ser(OBzl)·Thr·Cys(ZBzl)" to read
-- BOC·Cys(SBzl)·Ser(OBzl)·Asn·Leu·Ser(OBzl)·Thr·Cys(SBzl) --

Signed and sealed this 29th day of August 1972.

(SEAL)
Attest:

EDWARD M. FLETCHER, JR.
Attesting Officer

ROBERT GOTTSCHALK
Commissioner of Patents

FORM PO-1050 (10-69)